UNITED STATES PATENT OFFICE 3,487,880
Patented Jan. 6, 1970

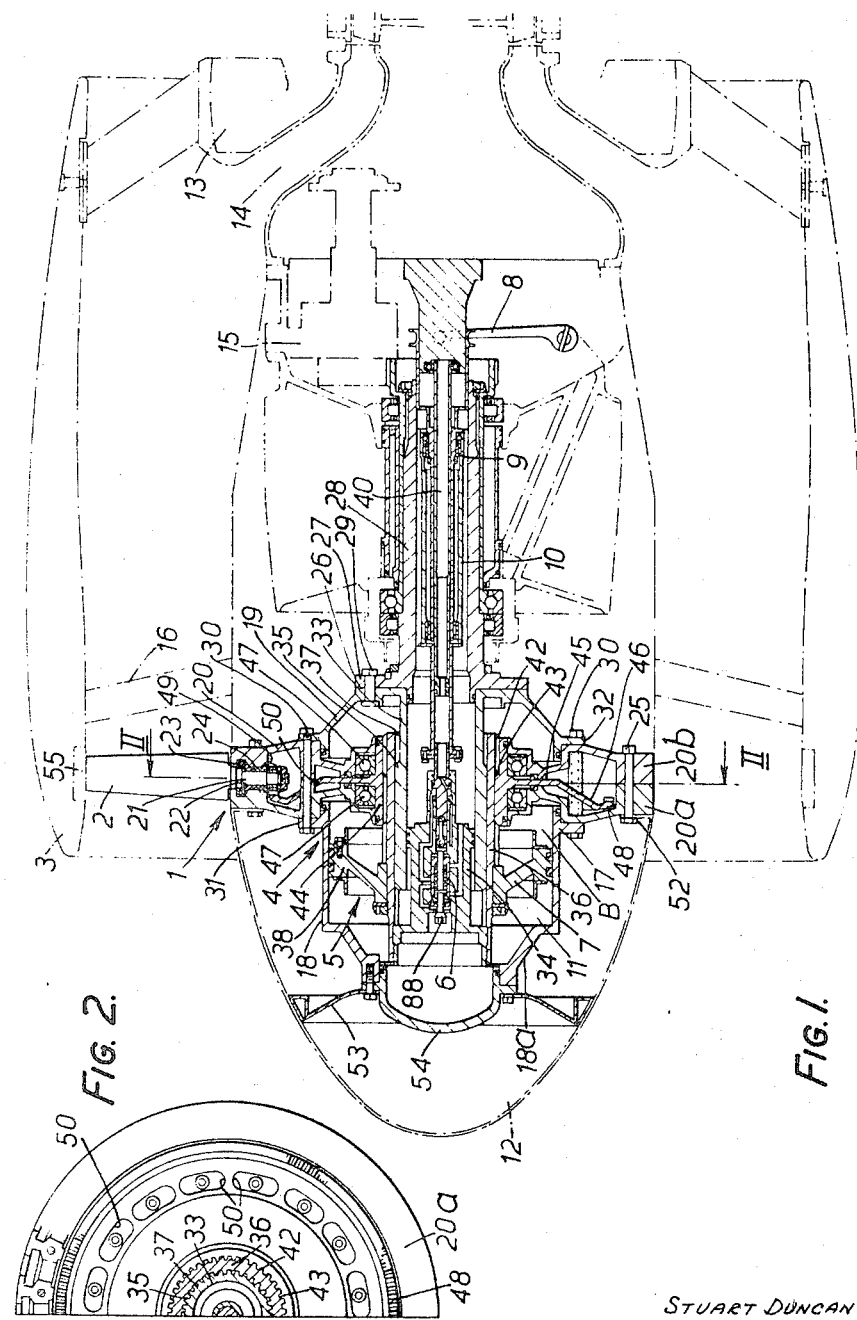

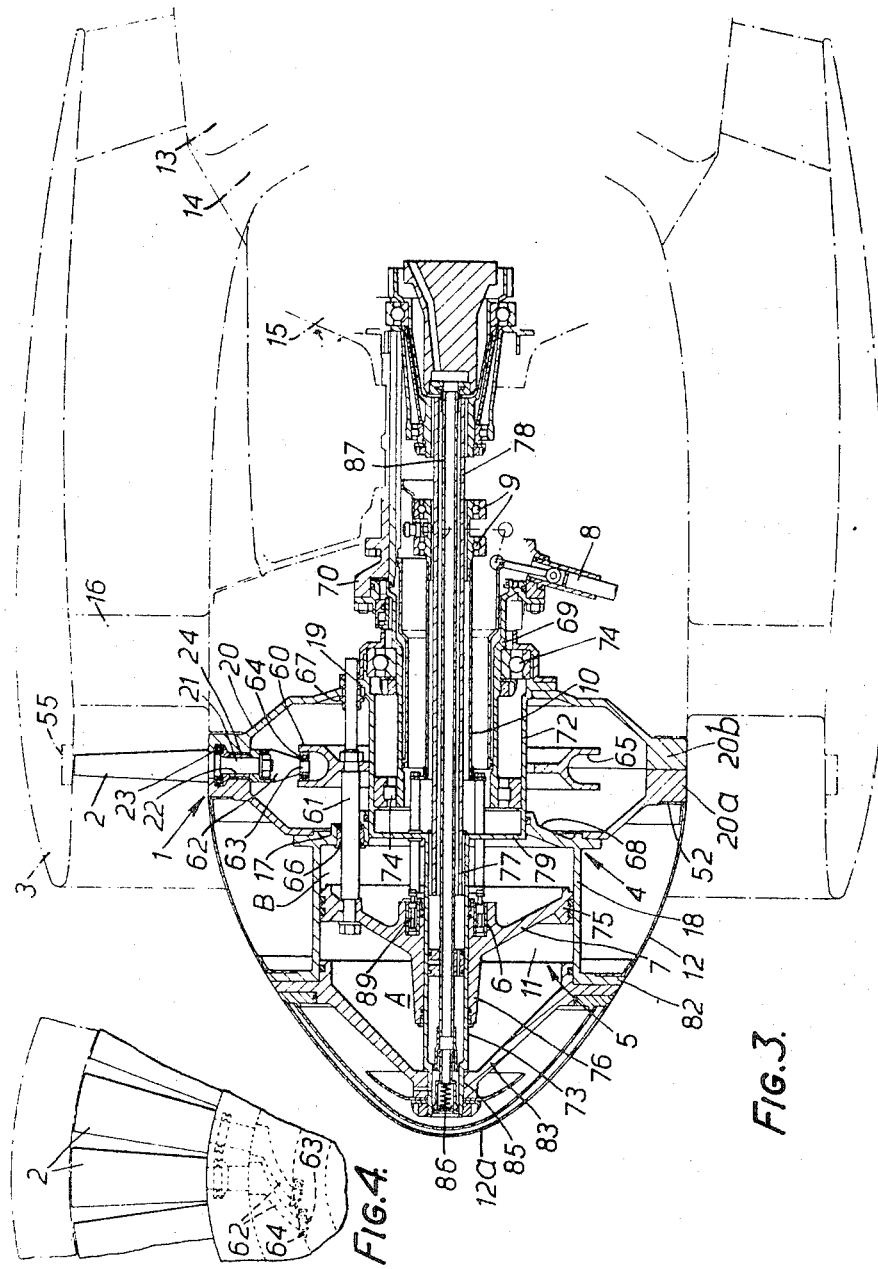

3,487,880
VARIABLE PITCH FANS
Stuart Duncan Davies and John Alfred Chilman, Painswick, England, assignors to Dowty Rotol Limited, Gloucester, England
Filed Apr. 12, 1967, Ser. No. 630,254
Claims priority, application Great Britain, Apr. 12, 1966, 16,008/66; May 25, 1966, 23,428/66; Sept. 12, 1966, 40,544/66
Int. Cl. B64c 11/38, 11/06
U.S. Cl. 416—157                              12 Claims

ABSTRACT OF THE DISCLOSURE

A variable pitch fan has a large multiplicity of blades which are adjustable for pitch, during rotation of the fan, under the control of a servo system housed, at least in part, within a hub structure of the fan. Means are provided for converting movement of an output member of the servo motor at a point near the axis of rotation of the fan into pitch-changing movement of the blades which are radially displaced from said axis around the periphery of the hub structure. The servo system is preferably hydraulic, and a helical cam mechanism may convert linear movement of the output member into rotary movement of a bevel gear which meshes with bevel pinions fast on the fan blade roots.

---

This invention relates to fans, and more particularly to fans for gas turbine engines.

According to the invention, a variable-pitch fan has a large multiplicity of blades which are adjustable for pitch during rotation of the fan under the control of a servo system housed, at least in part, within a hub structure of the fan, means being provided for converting movement of an output member of a motor at a point near the axis of rotation into pitch-changing movement of the blades which are radially displaced from said axis around the periphery of the hub structure.

The servo system is preferably hydraulic and comprises a hydraulic pitch-change motor, the aforesaid means converting linear movement of an output member of said motor into angular movement about their axes of all the blades in unison. The motor may include a helical cam mechanism whereby linear movement of said output member of the motor effects, through this mechanism, angular movement about the axis of rotation of the fan of gear teeth lying on a pitch circle of large diameter relatively to that of the pitch circle of gear teeth fast with each of the multiplicity of blade roots and with which the first gear teeth are in mesh, thereby to change the pitch of all the blades in unison. The first gear teeth are then provided by a bevel gear of large diameter relatively to that of small bevel pinions, one fast with each blade root.

The hub proper (hereinafter termed the hub) carrying the fan blades may be split to facilitate assembly of the blades and operating mechanism into the hub. Preferably the hub is split in a plane normal to the axis of rotation of the fan, front and rear halves of the hub being bolted together to hold the blades between them.

The same bolts as hold the front and rear halves of the hub together may also serve for the attachment of front and rear casings of the hub structure, thereby sandwiching the hub between such casings. The hub is preferably of hollow annular, i.e. substantially toroidal, form and of larger diameter than the front and rear casings. Consequently the sandwiching of the hub by such casings is effected at a point inwardly of its periphery. The through bolts which sandwich the hub between the rear and front casings may pass through clearance holes in said large diameter bevel gear, such holes being, for example, of elongated generally arcuate shape.

Preferably the hub structure, blading and servo system of the fan is arranged for rotation as an assembly within a non-rotative duct, coaxially with an engine turbine by which it is driven. The pitch-change motor preferably comprises a piston and cylinder device and in such case, therefore, the hydraulic cylinder, piston and a control valve, together with the hub structure of the fan in which they are housed and the blades carried by such hub structure, form a rotative assembly within the said non-rotative duct. Preferably a spinner is provided to enclose the forward part of the hub structure and forms part of the rotative assembly.

Preferably the front and rear halves of the hub each comprise a dished annulus so that when put together they form a thin hub of disc-like configuration with a circular periphery. The wall thickness of the dished annuli may be increased at the periphery to allow for the formation of radial bores in which the blade roots are received.

The fan may have associated stator blading carried by the duct. Such stator blading is preferably arranged rearwardly of the fan blading, i.e. on the downstream side thereof having regard to the direction of air flow from the fan, and is preferably of fixed pitch. The fan blading is preferably capable of movement into negative pitch, and when this reverse pitch is selected aerodynamic braking of an aircraft to which the fan is fitted is afforded.

The invention will now be further described with reference to the accompanying drawings which illustrate, by way of example, portions of two gas turbine engines embodying forward mounted fans in accordance with the invention. In the drawings:

FIGURE 1 is an axial sectional view illustrating the forward end of one of the engines, including details of the fan structure, FIGURE 2 is a half-section through the hub of the fan on the line II—II of FIGURE 1, FIGURE 3 is a view similar to FIGURE 1 of the forward end of the other engine, and FIGURE 4 is a fragmentary front end view illustrating the arrangement of the fan blading in the engine of FIGURE 3.

Each of the engines is of the by-pass type and includes a fan, indicated generally by the reference numeral 1, having flow-varying blading 2 and rotatable in a static by-pass duct 3. The fan 1 is mounted at the forward end of the engine ahead of the engine compressor with the blading 2 effectively adjustable in pitch under the control of a servo system of the closed-loop type housed within the hub structure 4 of the fan. The servo system includes a hydraulic pitch-change motor 5 and a follow-up servo valve 6 mounted within a piston assembly 7 of the motor 5.

The piston assembly 7 is connected to all the blades 2 of the fan 1, and the servo valve 6 is manually operable through a control linkage 8, only the engine end of which is shown in the drawings and which acts through a translation bearing or bearings 9 to produce axial, pitch-changing movements of a pitch control tube 10. The control tube 10 passes coaxially through the hub structure 4 and is connected with the valve 6, so that the control linkage 8 produces axial movement of the servo valve 6 within the piston assembly 7, which movement is followed-up by the motor 5 in a closed-loop manner to provide precise position control. A hydraulic cylinder 11 of the motor 5 in which the piston assembly 7 is axially slidable, the piston assembly 7 and control valve 6, together with the hub structure 4 of the fan in which they are housed and the blades 2 carried by the hub structure, form a rotative assembly within the nonrotative duct 3. A spinner 12 encloses the forward part of the hub structure 4 and also forms part of the rotative assembly. The hydraulic oil feed and return to and from the valve 6 is effected inside and outside of the rotatable control tube 10.

The compressor section, combustion system and turbine section of the engine may be of single shaft form, the outline of only the forward end of the compressor being illustrated at 13. A compressor inlet 14 communicates with the by-pass duct and is thus charged by the fan 1, pitch variation of the blading 2 of which not only varies the by-pass ratio but in effect provides a variable first compressor stage. The fan 1 has a large multiplicity of blades 2, for example seventeen or more, and is driven from the engine compressor/turbine shaft through a reduction gearbox illustrated in a general manner at 15. A ring of stator blades 16 of fixed pitch is mounted within the duct 3 rearwardly of the fan 1 and ahead of the compressor inlet 14. The fan blading 2 is capable of movement into negative pitch to reverse the air flow along the duct 3, and when such reverse pitch is selected aerodynamic braking of an aircraft to which the engine is fitted is afforded.

In each construction the hub structure 4 of the rotative assembly comprises a front casing 17 which has a forwardly projecting portion 18 providing the cylinder 11, a rear casing 19, and a hub 20 carrying the fan blading 2 and sandwiched between the casings 17 and 19 inwardly of the hub periphery. The hub 20 is split, comprising front and rear halves 20a and 20b bolted together to hold the blade roots 21 between them.

The blade roots 21 are held in radial bores 22 formed between the meeting faces of the front and rear halves of the hub 20 at its outer periphery. At this distance from the centre, and at the rotational speeds envisaged, the thrust and journal loads are high, particularly the former. Accordingly separate thrust and journal bearings 23 and 24 respectively are interposed between the blade roots 21 and the hub 20, each appropriate to the duties it has to perform. To keep the loads on the hub 20 to an acceptable level the best material for the blades 2 at the present time is titanium. A ring of bolts 25 (see FIGURE 1) holds the two hub halves 20a and 20b together in the vicinity of the blade roots 21, one of the bolts 25 being disposed between each two adjacent blade root bores 22.

Referring now to the construction of FIGURES 1 and 2, at its front end the rear casing 19 is open, its rear end comprising a wall 26 normal to the axis of rotation of the fan 1 and which serves for the attachment of the rear casing 19, and thus of the whole rotative assembly, to a fan mounting flange 27 at the forward end of an engine reduction gear shaft 28 through which the control tube 10 passes, all coaxial with the rotation axis of the compressor/turbine system of the engine. For this purpose the rear end wall 26 is provided with a ring of holes registering with a similar ring of holes in the mounting flange 27, driving bolts 29 passing through the pairs of holes in register. The hub 20 is of hollow annular, i.e. substantially toroidal, form and of larger diameter than the casings 17 and 19. An inner ring of bolts 30 which assists in holding the hub halves 20a and 20b together also passes through holes in flanges 31 and 32 of the casings 17 and 19, and thus additionally serve for the sandwiching of the hub 20 between such casings.

The rear end wall 26 is annular and has extending forwardly from its inner edge a hollow cylindrical spigot 33 which forms the centre of the hub structure 4 and projects through the hollow centre of the hub 20 and into the front casing 17. The inside diameter of the spigot 33 is machined to provide a cylindrical surface for axial sliding movement therealong of an inner portion 34 of the piston assembly 7, within which portion the control valve 6 is coaxially arranged and the valve porting is formed. The outer machined and generally cylindrical surface of the spigot 33 is provided with straight teeth or splines 35 to prevent relative rotation of the piston assembly 7, an intermediate tubular portion 36 of which forms the output member of the motor 5 and is slidable along the outer surface of the spigot 33. The piston assembly portion 36 is formed internally with straight teeth 37 to engage with the spaces between the teeth 35 on the outer surface of the spigot 33.

An outer portion 38 of the piston assembly 7 forms an outer piston slidable axially in the cylinder portion 18 of the front casing 17, and this casing portion is divided by the outer piston 38 into coarse pitch and fine pitch chambers A and B. Manually controlled movement of the control valve 6 operates to admit hydraulic fluid to either the chamber A or B dependent on the direction of valve movement and according to whether the pitch of the blades 2 is to be coarsened or fined. The hydraulic fluid is supplied under pressure to the rear end of the valve 6 through a conduit 40 which is itself supplied by an engine-driven pump (not illustrated) and passes coaxially through the reduction gear shaft 28.

The tubular portion 36 of the piston assembly 7 projects rearwardly in a sleeve-like manner along the spigot 33 through the hollow centre of the hub 20. On its outer surface it is provided with helical teeth 42 which engage the spaces between helical teeth 43 in a hollow boss 44 of a large bevel gear 45. This arrangement of the teeth 42 and 43 provides a helical cam mechanism whereby linear movement of the piston assembly 7 is converted to angular movement of the gear 45 about the axis of rotation of the fan 1.

The bevel gear 45 is disposed, apart from its boss 44, wholly within the hub 20, its web 46 being closely confined between the halves 20a and 20b of the hub 20 near the inner periphery of the latter. At its inner periphery the hub 20 seats upon the external cylindrical surface of the bevel gear boss 44 with the interposition of anti-friction bearings 47 between the outer cylindrical surface of the boss 44 and angular portions of the front and rear halves of the hub 20 to act as combined thrust and radial races when angular movement is to be imparted to the bevel gear 45 relatively to the hub 20.

Towards its outer periphery the bevel gear web 46 inclines, that is to say the central portion of the web 46 is dished in relation to its toothed rim 48, such inclination being permitted by the hollow toroidal form of the hub 20 at this diameter. The teeth on the rim 48 mesh with small bevel pinions 49 fast on the blade roots 21.

It will be seen that the ring of bolts 30 by which the hub 20 is sandwiched between the casings 17 and 19 have to pass through the web 46 of the bevel gear 45. To enable this to be done, and the bevel gear yet to be capable of the necessary limited angular movement relatively to the hub 20 to effect pitch adjustment of the blades 2, the web 46 is provided with clearance holes 50, preferably in the form of elongated arcuate slots, for the passage of the bolts 30. As an alternative to such a slotted bevel gear arrangement, the means for effecting angular movement of the multiplicity of small bevel pinions 49 in unison may take the form of a multiplicty of bevel-toothed segments mounted on radial arms or spokes between which the hub bolts 30 pass, the arrangement taking the form of a toothed spider.

The spinner 12 has an inwardly turned flange 52 at its base by which it is bolted to the front half 20a of the hub 20 and an annular plate attachment 53 towards its nose portion, such plate attachment bolting to the forward end 18a of the cylinder portion 18 of the front casing 17 of the hub structure. This forward end 18a of the front casing is frusto-conical in shape and a separate cylinder cover 54 is provided to close the otherwise open smaller end of the cylinder 11.

As will be seen both in FIGURES 1 and 3, the leading edge of the static by-pass duct 3 surrounding the rotative fan assembly is disposed slightly forwards of the base of the spinner 12, and the inner wall of the duct 3 is provided with a non-rotative reinforcing or guard ring 55 in the plane of the fan blades 2 and with which the tips of the blades have a close running clearance. This contains the blades 2 and protects the aircraft from serious damage in the event of blade shedding or bursting of the fan assembly 1.

In the engine of FIGURES 3 and 4 an alternative form of connection is provided between the piston assembly 7 of the pitch-change motor 5 and the multiplicity of blade roots 21. A unison ring 60 positioned coaxially within the hollow hub 20 and surrounding the forwardly projecting rear casing 19 is connected to the piston assembly 7 through a ring of connecting rods such as 61 which provide output members of the motor 5. Each blade root 21 has fast thereon a crank arm 62, the offset crank 63 of which carries a ball bearing 64 the outer race of which engages with a peripheral groove 65 of the unison ring 60. Thus axial movement of the unison ring 60 with the piston assembly 7, under the follow-up control of the valve 6, rotates all the crank arms 62 to effect pitch adjustment of the fan blades 2. The rods 61 pass through guide bushes 66 and 67, mounted respectively in a rear annular end wall 68 of the front casing 17 and in the rear hub half 20b. These guide bushes act to prevent relative rotation of the piston assembly 7 within the hub structure 4.

In this construction the rotative assembly is supported on a forwardly projecting fixed spigot 69 through which the control tube 10 passes and which is bolted to a mounting flange 70 at the forward end of the reduction gearbox 15. A forwardly projecting hollow portion of the rear casing 19 again projects into the front casing 17 but in this case is of stepped cylindrical form. It comprises a larger diameter section 72, which is surrounded by the unison ring 60 and closes the centre of the hollow hub and a forward spigot section 73. The larger section 72 is mounted on the fixed spigot 69 through anti-friction bearings 74, and the forward spigot section 73 again provides a hub centre on which the piston assembly 7 slides. With this construction the assembly 7 is of simpler form with an outer piston portion 75 which slides in the cylinder 11 and divides the latter into coarse pitch and fine pitch chambers A and B, and a central tubular portion 76 which slides on the machined external cylindrical surface of the spigot 73.

At its rear end the spigot 73 is internally splined at 77 to provide a driving connection with a tubular reduction gearbox shaft 78 which projects forwardly into the spigot 73 coaxially through the control tube 10 and the fixed spigot 69. The spigot 73 joins the casing section 72 of the rear casing 19 through an annular radial wall 79, and thus again the hub 20 is driven through the rear casing 19. The cylinder portion 18 of the front casing 17 is in this case formed with an end flange 82 to which a frusto-conical cylinder cover 83 is bolted. The cover 83 projects forwardly into a double-skin nose portion 12a of the spinner 12 which is supported on the cylinder flange 82, the remaining outer portion of the spinner 12 being similarly supported at the forward end and, as before, flanged at 52 for bolting to the front half 20a of the hub 20.

The forward end of the spigot 73 is supported in an end aperture 85 in the cylinder cover 83, and carries an oil pressure relief valve 86 which discharges on to the spinner nose portion 12a to cool the oil and heat the spinner for anti-icing purposes. A conduit 87 leads forwardly coaxially through the hollow drive shaft 78 to feed oil to the control valve 6, such conduit extending to the rear or inlet side of the relief valve 86. As will be seen, the control valve 6 in this embodiment is offset with respect to the rotation axis, being slidable in the piston portion 76 externally of the spigot 73.

In both engines a second valve 88 is arranged in series, in the hydraulic sense, between the control valve 6 and the coarse pitch chamber A. The valve 88 is normally in the open position but closes if the piston drifts away from the selected position, due for example to loss of oil pressure or linkage fracture, and forms a hydraulic lock with the oil trapped in the chamber A.

What is claimed is:

1. A variable pitch fan comprising a multiplicity of blades which are adjustable for pitch, a hub structure which is split in a plane normal to the axis of rotation of the fan to provide front and rear hub portions which are bolted together to hold the blades between them around the periphery of the hub structure, a servo system housed, at least in part, within said hub structure and operative to control pitch adjustment during rotation of the fan, the servo system including a pitch-change motor, a bevel gear member rotatably mounted in said hub structure so as to turn about said axis, and a multiplicity of small bevel pinions respectively fast with roots of said blades and in mesh with teeth of said bevel gear member, the hub portions having inwardly facing abutments which meet within the hub structure radially inwardly of the bevel teeth and the bevel gear member being cut away to provide clearance for the abutments of at least one of said hub portions.

2. A variable pitch fan according to claim 1, wherein bolts which hold the front and rear portions of the hub together also serve for the attachment of rear and front casings of the hub structure, thereby sandwiching the hub portions between such casings.

3. A variable pitch fan according to claim 2, wherein the hub section provided by the front and rear portions is of hollow annular, i.e. substantially toroidal, form and of larger diameter than said front and rear casings, the sandwiching of the hub portions by said casings being effected at a point inwardly of the hub periphery.

4. A variable pitch fan according to claim 1, wherein said bevel gear member comprises a ring gear with a toothed outer periphery and a web formed with clearance holes for said abutments.

5. A variable pitch fan according to claim 4, wherein said web of the bevel gear is dished in one axial direction within the hub structure between said hub portions, and the toothed peripheral rim of the bevel gear has teeth facing in the opposite axial direction.

6. A variable pitch fan comprising an multiplicity of blades which are adjustable for pitch, a hub structure which is split in the region of roots of said blades to provide front and rear hub portions which are fixed together to hold the blades between them around the periphery of the hub structure, a servo system housed, at least in part, within said hub structure and operative to control pitch adjustment during rotation of the fan, the servo system including a pitch-change motor, a member formed with bevel gear teeth and rotatably mounted in said hub structure so as to turn about said axis, and a multiplicity of small bevel pinions respectively fast with said blade roots and in mesh with said bevel gear teeth, the hub portions being bolted together by a ring of bolts disposed radially inwardly of the bevel teeth and the gear member being cut away to provide clearance for each of the ring of bolts.

7. A variable pitch fan according to claim 6, wherein the hub structure, blading and servo system of the fan is arranged for rotation as an assembly within a non-rotative duct, coaxially with an engine turbine by which it is driven.

8. A variable pitch fan according to claim 6, wherein the motor comprises a piston and cylinder device, the hydraulic cylinder, piston and a control valve, together with the hub structure of the fan in which they are housed and the blades carried by said hub structure, form a rotative assembly within a non-rotative duct.

9. A variable pitch fan according to claim 8, wherein a spinner is provided to enclose the forward part of the hub structure and forms part of the rotative assembly.

10. A variable pitch fan according to claim 6, wherein said front and rear portions of the hub structure each comprise a dished annulus and together form a thin hub of disc-like configuration with a circular periphery.

11. A variable pitch fan according to claim 10, wherein the wall thickness of the dished annuli is increased at the periphery to allow for the formation of radial bores in which the blade roots are received.

12. A variable pitch fan according to claim 6, wherein each of said hub portions has inwardly projecting abutments through which said bolts pass and which engage facing abutments on the other hub portions, said cutting away of the gear member providing clearance for the abutments also.

References Cited

UNITED STATES PATENTS

| | | | |
|---|---|---|---|
| 2,939,536 | 6/1960 | Kearns | 170—160.61 X |
| 2,969,118 | 1/1961 | Allen | 170—160.32 |
| 3,054,458 | 9/1962 | Marsico | 170—160.45 |
| 3,130,677 | 4/1964 | Liebhart | 170—160.61 X |
| 3,159,221 | 12/1964 | Gaubis et al. | 170—160.61 X |
| 2,284,938 | 6/1942 | Allen. | |
| 2,316,940 | 4/1943 | Dewey et al. | |
| 2,844,303 | 7/1958 | Kristiansen. | |
| 3,021,696 | 2/1962 | Spiegelhalter | 170—160.3 X |

EVERETTE A. POWELL, Jr., Primary Examiner